(12) United States Patent
Phillips et al.

(10) Patent No.: US 6,986,907 B2
(45) Date of Patent: Jan. 17, 2006

(54) CHEWING GUM BASE AND CHEWING GUM COMPOSITIONS

(75) Inventors: David Phillips, Cresthill, IL (US); Chungsea Shen, Deerfield, IL (US); Michael Reed, Merrillville, IN (US); Mansukh Patel, Downers Grove, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 154 days.

(21) Appl. No.: 10/604,516

(22) Filed: Jul. 28, 2003

(65) Prior Publication Data

US 2005/0025858 A1 Feb. 3, 2005

(51) Int. Cl.
*A23G 3/30* (2006.01)

(52) U.S. Cl. .......... 426/3; 426/4; 426/5; 426/6
(58) Field of Classification Search ........... 426/3, 426/4, 5, 6, 811
See application file for complete search history.

(56) References Cited

U.S. PATENT DOCUMENTS

| | | | | |
|---|---|---|---|---|
| 3,984,574 | A | * 10/1976 | Comollo | 426/4 |
| 4,246,286 | A | 1/1981 | Klose et al. | |
| 4,378,374 | A | 3/1983 | Reggio et al. | |
| 4,379,169 | A | 4/1983 | Reggio et al. | |
| 4,452,820 | A | 6/1984 | D'Amelia et al. | |
| 4,518,615 | A | * 5/1985 | Cherukuri et al. | 426/4 |
| 4,794,003 | A | * 12/1988 | Cherukuri et al. | 426/6 |
| 4,842,870 | A | * 6/1989 | Dokuzovic et al. | 426/3 |
| 5,336,509 | A | 8/1994 | McGrew et al. | |
| 5,424,081 | A | 6/1995 | Owusu-Ansah et al. | |
| 5,437,877 | A | 8/1995 | Reed et al. | |
| 5,462,754 | A | 10/1995 | Greenburg et al. | |
| 5,487,902 | A | 1/1996 | Andersen et al. | |
| 5,580,590 | A | 12/1996 | Hartman | |
| 5,672,367 | A | 9/1997 | Grijpma et al. | |
| 6,153,231 | A | 11/2000 | Li et al. | |
| 6,194,008 | B1 | 2/2001 | Li et al. | |
| 6,627,234 | B1 | * 9/2003 | Johnson et al. | 426/5 |

FOREIGN PATENT DOCUMENTS

| | | |
|---|---|---|
| EP | 0421670 A2 * | 4/1991 |
| EP | 0 711 506 A2 | 5/1996 |
| EP | 1 287 746 A1 | 3/2003 |
| JP | 61-150688 | 1/1988 |
| JP | 1996-131082 | 5/1996 |
| WO | WO 92/08836 A1 | 5/1992 |
| WO | WO 96/20609 A1 | 7/1996 |
| WO | WO 96/28041 A1 | 9/1996 |
| WO | WO 98/58550 A2 | 12/1998 |
| WO | WO 01/24640 A2 | 4/2001 |
| WO | WO 02/17730 A1 | 3/2002 |
| WO | WO 2005/011397 A1 | 2/2005 |

* cited by examiner

*Primary Examiner*—Keith Hendricks
(74) *Attorney, Agent, or Firm*—Steven P. Shurtz; Brinks Hofer Gilson & Lione

(57) ABSTRACT

A chewing gum base essentially free of non-silica fillers, comprising high molecular weight polyisobutylene, optionally amorphous silica and polyvinylacetate and powdered lecithin present in the chewing gum composition and optionally spray-dried flavor in the chewing gum composition.

83 Claims, No Drawings

CHEWING GUM BASE AND CHEWING GUM COMPOSITIONS

BACKGROUND OF INVENTION

The present invention relates to the composition of, and methods of producing a chewing gum base and chewing gum. More specifically, the present invention relates to chewing gum base compositions that produce gum bases and chewing gums having reduced adhesion to outdoor surfaces as compared to typical chewing gum compositions.

When chewing gum is chewed, an insoluble portion remains. Although the remaining insoluble portion can be easily disposed of without creating any problems, when improperly disposed of, can create a nuisance. Due to their typical formulation, chewing gums have an adhesive-like characteristic. Therefore, the chewed gum can stick to outdoor surfaces onto which they are intentionally or unintentionally placed. Such surfaces can include concrete, flooring materials, walls, carpeting, metal, wood, plastic, glass and other surfaces. It is because of these circumstances that there is a consumer demand for a more removable chewing gum.

Formulating an acceptable removable chewing gum cud has significant challenges in that, the product has to remain organoleptically desirable for the consumer, while being removable. Furthermore, the ingredients and processing of the gum base and chewing gums must be sufficiently inexpensive to permit commercial manufacture and sale at prices competitive with traditional formulations. All ingredients used must be safe for human consumption and ideally are already approved for food use. This is a difficult balance to achieve. There have been attempts in the past to formulate removable chewing gum bases and chewing gum compositions. None of these attempts have made a significant impact on the issues presented by improper disposal of chewing gum cuds. U.S. Pat. No. 5,601,858, herein incorporated by reference, discloses a non-stick chewing gum which contains a blend of different molecular weight polyvinylacetates (PVAc), filler, non-elastomer solvent resin, and is essentially free of fats and waxes. U.S. Pat. No. 3,285,750, herein incorporated by reference, discloses a resinous chewing gum base composition with at least one adhesion resistant agent such as polyolefin and flourine containing resin. This chewing gum cud did not adhere to fabrics and various other surfaces.

Due to the above stated issues, there is a need for chewing gum products with reduced adhesion to surfaces.

SUMMARY OF INVENTION

The present invention provides a gum base, and resulting chewing gum, that exhibits reduced adhesion to surfaces. As used herein, a chewing gum cud which can be easily removable, is one which has a 50% or greater reduction in removal time compared to typical conventional chewing gums and less than 20% by weight residue remaining on a surface to which it was stuck. Chewing gums which can be made from the chewing gum base of the present invention include chewing gums in coated pellet form, sticks, tabs, tapes, chunks and bubble gums standard in the art.

The present invention provides a chewing gum base, essentially free of non-silica fillers, containing an effective amount of high molecular weight polyisobutylene, optionally silica and optionally low molecular weight polyvinylacetate. The present invention further provides for a chewing gum composition comprising the inventive gum base and further comprising, as optional components, powdered lecithin and spray-dried flavor, used as a partial or complete replacement for liquid flavor present in the water soluble portion of the chewing gum composition to make an easily removable chewing gum. The combination of these components are believed to increase the hydrophilic properties and reduce plasticization of the chewed gum cud, preventing it from sticking to surfaces and increasing the ease at with which it can be removed from these surfaces.

It is an advantage of the present invention to provide a more easily removable chewing gum base and chewing gum. The present invention has a high affinity for water, which will result in faster weathering in the presence of significant rain. If cud is disposed of improperly, it is removable via a scraper, mechanical sweeper, scrubber or even by natural weathering.

The present invention provides a firm chew, bulky cud with no tack to the teeth of the chewer and is easily processed. The gum base of the present invention is also relatively hydrophilic and may be used as a delivery for lipophilic active agents or medicaments, which would be bound to gum base and not released into the digestive tract. The chewing gum can be produced from food-approved ingredients and has the potential to be economically feasible and consumer acceptable.

The present invention provides a chewing gum composition wherein the gum base comprises high molecular weight polyisobutylene, and is essentially free of non-silica filler.

Additional features, advantages and embodiments of the present invention will be described in and apparent from the detailed description of the invention.

DETAILED DESCRIPTION

The present invention provides improved gum bases. Moreover, the present invention provides improved chewing gums. In addition, the present invention provides an easily removable gum cud. Moreover, the present invention provides an improved method of making chewing gum base and chewing gum.

Chewing gum generally comprises a water soluble portion and a water insoluble portion. The water insoluble portion is referred to as the gum base.

The present invention provides a gum base which is essentially free of non-silica filler, and comprises high molecular weight polyisobutylene and optionally amorphous silica and low molecular weight Polyvinylacetate (PVAc). The present invention also provides chewing gums made from the inventive gum bases, which may optionally comprise powdered lecithin and spray-dried flavor. It is believed that the chewing gum bases and chewing gums of the present invention exhibit greater hydrophilicity and reduced plasticization in the chewed gum cud to render it easily removable by increasing its removability from environmental surfaces when exposed to moisture.

The present invention provides a chewing gum composition wherein the gum base comprises high molecular weight polyisobutylene, and is essentially free of non-silica filler.

In an embodiment, the gum base further comprises amorphous silica.

In an embodiment, the gum base further comprises low molecular weight polyinylacetate.

In an embodiment, the gum base further comprises terpene resin.

In an embodiment, the high molecular weight polyisobutylene is present in an amount ranging from about 5% to about 15% by weight of the gum base.

In an embodiment, the high molecular weight polyisobutylene is preferably present in an amount of about 8% by weight of the gum base.

In yet another embodiment, the amorphous silica is present in an amount ranging from about 2% to about 15% by weight of the chewing gum base.

In yet another embodiment, the amorphous silica is preferably present in an amount of about 5% by weight of the chewing gum base.

In yet another embodiment, the low molecular weight polyvinylacetate is present in an amount up to about 45% by weight of the chewing gum base.

In yet another embodiment, the low molecular weight polyvinylacetate is preferably present in an amount ranging from about 25% to about 40% by weight of the chewing gum base.

In yet another embodiment, the present invention provides a chewing gum composition comprising powdered lecithin and a gum base comprising high molecular weight polyisobutylene, low molecular weight polyvinylacetate and amorphous silica, wherein the gum base is essentially free of non-silica filler.

In yet another embodiment, a chewing gum composition comprises powdered lecithin, spray dried flavor and a gum base comprising high molecular weight polyisobutylene, low molecular weight polyvinylacetate and amorphous silica, wherein the gum base is essentially free of non-silica filler.

The chewing gum base of the present invention is essentially free of non-silica filler. For purposes of the description of the present invention, being essentially free of non-silica filler can mean that the optional use of non-silica filler at levels of about 0% to about 5% by weight of the chewing gum base is acceptable. It is believed that this increases the viscosity, and minimizes the plasticization of the chewing gum cud. In an embodiment of the present invention, the chewing gum base is free of non-silica filler.

High molecular weight polyisobutylene is used in the gum base of the present invention. It is used as a replacement of up to 80% of butyl rubber in the formulation of the chewing gum base. High molecular weight polyisobutylene provides a cohesive property and is believed to reduce the cold flow property of a discarded chewing gum cud into environmental surfaces. The high molecular weight polyisobutylene also improves the softness of a chewing gum cud for improved organoleptic quality. The average molecular weight of the high molecular weight polyisobutylene used in the present invention ranges from about 200,000 daltons to about 600,000 daltons. Preferably, the average molecular weight of high molecular weight polyisobutylene used in the present invention is about 400,000 daltons. The amount of high molecular weight polyisobutylene present in the inventive chewing gum base ranges from about 5% to about 15% by weight of the chewing gum base. Preferably, the amount of high molecular weight polyisobutylene is present in the amount of about 8% by weight of the chewing gum base. A high molecular weight polyisobutylene suitable for use in the present invention is OPANOL 50 SF, available from BASF in Ludwigshafen, Germany.

Amorphous silica may optionally be added to the inventive chewing gum base composition because silica has low oil absorption properties as compared to non-silica fillers. One amorphous silica which may be used in the present invention has an average particle size of 16 µm, pH of about 7, oil absorption of about 55 g/100 g and Perspex abrasion value of about 35. The specifications of the silica used is not believed to be critical, but specifications of silicas known to be operable are herein disclosed. The silica in the present invention may have a range of average particle size of 4.5 to 18 µm. The amount of amorphous silica used in the present invention ranges from about 2% to about 15% by weight of the chewing gum base. Preferably, the amount of amorphous silica used in the present invention is about 5% by weight of the chewing gum base. These levels include any moisture, typically 2% to 4%, that may be present on commercially available silicas. The addition of amorphous silica improves the organoleptic quality of the chewing gum composition by countering an oily experience provided by the powdered lecithin which may be a component in the present invention, and has low oil absorption properties. The amorphous silica used in the present invention is preferably DH338 and is available from INEOS Silicas Inc., in Warrington, England.

Low molecular weight polyvinylacetate may optionally be added to the inventive chewing gum base composition. The molecular weight of the PVAc ranges from an average of about 6,000 daltons to an average of about 40,000 daltons. Preferably, the average molecular weight of the low molecular weight PVAc ranges from about 12,000 daltons to about 15,000 daltons. The low molecular weight PVAc is used in the present invention in amounts up to about 45% by weight of the chewing gum base. Preferably, the amount of low molecular weight PVAc present is in the range from about 25% to about 40% by weight of the chewing gum base. Even more preferably, the amount of low molecular weight PVAc is present at about 34% by weight of the chewing gum base. One PVAc suitable for use in the present invention is Vinnapas B15 Spezial, available from Wacker in Burghausen, Germany.

Conventionally, chewing gum base is used in amounts of about 18% to about 36% by weight of the chewing gum composition. The chewing gum base of the present invention is typically used in chewing gum compositions in lower amounts than standard chewing gum bases known in the art. In the present invention the chewing gum base can be used in amounts ranging from about 15% to about 30% by weight of the chewing gum composition. This allows for a comparable mouthfeel in the size of the chewing gum cud as compared to conventional chewing gums, because the hydrophillic nature of the base increases swelling when exposed to the moisture of the mouth during chewing. The amount of bulking agent in the chewing gum composition is then increased by about 20% to allow for comparable swelling and chew qualities to conventional chewing gum products.

Plasticizers used in the gum base of the present invention may include triacetin, medium chain triglyceride, mono-, di- and triglycerides of fatty acids, terpene resins derived from alpha-pinene, beta-pinene or d-limonene, triglycerides of non-hydrogenated, partially hydrogenated and fully hydrogenated cottonseed oil, soybean oil, palm oil, palm kernel oil, coconut oil, safflower oil, tallow oil, cocoa butter, unsaturated oils that contain, as one or more of their constituent groups, fatty acids of carbon chain length of from 6 to 18, monoglycerides, diglycerides, acetylated monoglycerides, distilled mono-, and di-glyercides and lecithin may, from their manufacturing processing, contain triglyceride levels less than 2 percent by weight. Mono- and diglycerides maybe considered as being of the same family as fats.

Preferred plasticizers include triacetin, acetylated mono-, di- and triglycerides of short chain fatty acids, acetlyated mono-, di- and triglycerides of medium chain fatty acids, acetylated monoglycerides of long chain fatty acids, methyl ester of rosin and low molecular weight PVAc.

Non-silica fillers, which may be used at levels up to 5% in the present invention, may be selected from carbonate or precipitated carbonate types, such as magnesium and calcium carbonate, ground limestone, silicate types such as magnesium and aluminum silicate, clay alumina, talc, titanium dioxide, mono-, di- and tricalcium phosphate, and mixtures thereof.

Emulsifiers, which also sometimes have plasticizing properties, used in gum bases of the present invention may be selected from the following, glycerol mono and distearate, lecithin, mono and di-glycerides of fatty acids, triacetin, acetylated monoglyceride, polyglycerol esters, glycerol triacetate and carbohydrate polyesters, or combinations thereof.

In addition to high molecular weight polyisobutylene and low molecular weight PVAc previously described, conventional elastomers may also be incorporated into the inventive gum base. Elastomers provide the rubbery, cohesive nature to the gum which varies depending on this ingredient's chemical structure and how it is compounded with other ingredients. Elastomers suitable for use in the gum base and gum of the present invention include butadiene-styrene copolymers (SBR), isobutylene-isoprene copolymers (Butyl rubber), polybutadiene, low or medium molecular weight polyisobutylene, and vinyl polymeric elastomers (polyvinyl acetate, polyethylene, vinyl acetate/vinyl laurate, vinyl acetate/vinyl stearate, ethylene/vinyl acetate) or mixtures thereof.

Other optional ingredients such as antioxidants may also be used in the gum base. Antioxidants prolong shelf-life and storage of gum base, finished gum or their respective components, including fats and flavor oils. Antioxidants suitable for use in gum base or gum of the present invention include butylated hydroxyanisole (BHA), butylated hydroxytoluene (BHT), beta-carotenes, tocopherols, acidulants such as vitamin C, propyl gallate, and other synthetic and natural types, or mixtures thereof. Preferably, the antioxidants used in the gum base are butylated hydroxyanisole (BHA), butylated hydroxytoluene (BHT), tocopherols, or mixtures thereof.

The present invention is preferably essentially free of waxes. In the prior art and conventional gum bases, waxes may be used in the gum base. Waxes aid in the solidification of gum bases and improving the shelf-life and texture. Wax crystal also improves the release of flavor. The smaller crystal size allows slower release of flavor since there is more hindrance of the flavor's escape from this wax versus a wax having larger crystal sizes. Wax-free gum bases are specifically contemplated by the present invention. In these embodiments, wax is omitted and may be compensated for by using increased levels of fats and oils as is known in the prior art. Low molecular weight waxes can increase the flow of the chewing gum cud into porous surfaces and are therefore undesirable in easily removable gum bases.

Synthetic waxes are produced by means atypical of petroleum wax production and thus are not considered petroleum wax. These synthetic waxes may be used in accordance with the present invention and may be included optionally in the gum base and gum.

The synthetic waxes may include waxes containing branched alkanes and copolymerized with monomers such as, but not limited to, polypropylene and polyethylene and Fischer-Tropsch type waxes. Polyethylene wax is not in the same category as polyethylene, a polymer of ethylene monomers. Rather, polyethylene wax is a synthetic wax containing alkane units of varying lengths having attached thereto ethylene monomers.

Elastomer plasticizers vary the firmness of the gum base. The present invention is preferably free of ester gums. The plasticizers used are synthetic elastomer plasticizers such as terpene resins derived from alpha-pinene, beta-pinene and/or d-limonene and mixtures thereof.

The elastomer plasticizers used may be of one type or of combinations of more than one. Typically, the ratios of one to the other are dependent on each respective softening point, on each effect on flavor release, and on each respective degree of tack they cause to the gum. The preferred elastomer plasticizers of the present invention are terpene resins, as the ester gums have a tendency to increase adhesion to surfaces. The amount of terpene resin is also maintained at conventional levels in the chewing gum base composition, as surprisingly, the elastomer solvent did not significantly increase the tackiness of the chewing gum product. The approximate amount of terpene resin used in the present invention is about 10% to about 35 by weight of the chewing gum base.

Non-silica fillers which may be used as a filler to levels up to 5% in the inventive gum base are most typically calcium carbonate and talc. While calcium carbonate is generally preferred, talc filler may be used in gum bases and gums of the present invention that may come in contact with or employ acid flavors or provide an acidic environment needed to prevent degradation of an artificial sweetener.

Mean particle size for calcium carbonate and talc fillers typically range from about 0.1 micron to about 15 microns. More preferably, the optional fillers used preferably have a mean particle size range from about 0.4 to about 14 microns and are calcium carbonate and talc.

Gum bases are typically prepared by adding an amount of the elastomer, filler and elastomer solvent to a heated sigma blade mixer with a front to rear speed ratio of about 1:1 to about 2:1, the higher ratio typically being used for chewing gum base which requires more rigorous compounding of its elastomers.

Compounding typically begins to be effective once the ingredients have become homogenous. Anywhere from 15 minutes to 90 minutes may be the length of compounding time. Preferably, the time of compounding is from 20 minutes to about 60 minutes. The amount of added plasticizer depends on the level of elastomer present. If too much elastomer plasticizer is added, the initial mass becomes over plasticized and not homogeneous.

Continuous processes using mixing extruders may also be used to prepare the gum base. After the initial ingredients have massed homogeneously and been compounded for the time desired, the balances of the base ingredients are added in a sequential manner until a completely homogeneous molten mass is attained. Typically, any remainder of elastomer and plasticizer are added after the initial compounding time. The optional waxes and the oils are typically added after the elastomer and plasticizers. Then the mass is allowed to become homogeneous before discharging.

U.S. Pat. No. 6,238,710, herein incorporated by reference, claims a method for continuous chewing gum base manufacturing. The method entails compounding all ingredients in a single extruder. U.S. Pat. No. 6,086,925 discloses the manufacture of chewing gum base by adding a hard elastomer, a filler and a lubricating agent to a continuous mixer. U.S. Pat. No. 5,419,919 discloses continuous gum base manufacture using a paddle mixer by selectively feeding different ingredients at different locations on the mixer. Yet another U.S. Pat. No. 5,397,580 discloses continuous gum base manufacture wherein two continuous mixers are arranged in series and the blend from the first continuous mixer is continuously added to the second continuous mixer.

Typical base batch processing times may vary from about one to about three hours, preferably from about 1.5 to 2.5 hours, depending on the formulation. The final mass temperature when discharged may be between 50° C. and 130° C. and preferably between 70° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

In the alternative continuous process, ingredients are added continuously at various points along the length of the extruder. In this case, the transit time through the extruder would be substantially less than an hour.

The water-soluble portion of the chewing gum may comprise softeners, sweeteners, flavoring agents and combinations thereof. The sweeteners often function also as bulking agents in the gum. The bulking agents generally comprise from approximately 5% to about 90%, preferably from approximately 20% to about 80% of the finished gum.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, erythritol, isomalt, xylitol, hydrogenated starch hydrolysates, maltitol and the like, alone or in any combination.

High intensity artificial sweeteners can also be used, alone or in combination, with the above. Preferred sweeteners include, but are not limited to, sucralose, aspartame, NAPM derivatives such as neotame, salts of acesulfame, altitame, saccharin and its salts, cyclamic acid and its salts, glycyrrhizinate, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

The powdered de-oiled lecithin optionally employed in the inventive chewing gum composition, provides low oil absorption qualities. The powdered lecithin is also a process aid in the production of the chewing gum product. Powdered lecithin, in addition, retains moisture and absorbs moisture readily. In the present invention, the lecithin is preferred to be mixed with the bulking agent (sugar, sorbitol etc.) before adding to the gum mixer. The powdered lecithin may be used in the present invention in amounts of about 3% to about 9% by weight of the chewing gum composition. Preferably, the powdered lecithin is used in amounts of about 4% to about 7% by weight of the chewing gum composition. Furthermore, if the chewing gum composition is a pellet, the amount of powdered lecithin used is about 7% by weight of the chewing gum composition. If the chewing gum composition is a stick form, the amount of powdered lecithin used is about 5–6% by weight of the chewing gum composition.

The powdered lecithin may also be used in an encapsulated form. Lecithin substitutes may also be used to provide the same advantages described herein. Specific fractions of lecithin purifications may also be used to provide the same advantages described herein. The powdered lecithin used in the present invention is EMULPUR IP and EMULGUM from Degussa in Hamburg Germany.

Softeners are added to the chewing gum in order to optimize the chewability and mouth feel of the gum. Softeners typically constitute from approximately 0.5% to about 25.0% by weight of the chewing gum. Softeners contemplated for use in the gum include glycerin, lecithin and combinations thereof. Further, aqueous sweetener solutions such as those containing sorbitol, hydrogenated starch hydrolysates, corn syrup and combinations thereof may be used as softeners and bulking agents in gum. Sugar-free formulations are also typical.

The amount of glycerin is decreased by about 30% in the present invention from the standard amounts used in the prior art. Typically, glycerin is used at about 4%. In the present invention, about 2.5% glycerin is used in the chewing gum base composition. Because of the inclusion of lecithin in the chewing gum composition, the amount of glycerin is reduced due to its hygroscopic nature.

Flavorants and colorants impart characteristics or remove or mask undesired characteristics.

A flavoring agent may be present in the chewing gum in an amount within the range of from approximately 0.1 to about 10.0 weight percent, and preferably from approximately 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, close oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

A chewing gum composition made with the chewing gum base of the present invention may also have spray dried flavor as a partial or complete replacement of liquid flavor. This reduces the plasticizing or tackifying quality that liquid flavors provide. The amount of liquid flavor used would reduce to about 0.4% to about 2% by weight of the chewing gum composition. The loading of the spray dried flavor used in the present invention can be approximately 20% active. The amount of spray dried flavor may be used up to about 2% by weight of the chewing gum composition. Preferably, spray dried flavor is used in amounts ranging from about 0.2% to about 2% by weight of the chewing gum composition. Even more preferably, spray dried flavor is used at about 1% by weight of the chewing gum composition.

Optional ingredients such as colors, emulsifiers and pharmaceutical agents, coolants, oral sensates, active agents, antimicrobials, tooth whitening agents, medicaments, breath freshening agents, nutritional supplements, wellness agents, weight loss agents, and combinations thereof may be added to the chewing gum. Colorants may typically include FD&C type lakes, plant extracts, fruit and vegetable extracts and titanium dioxide.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

Although generally the gum base is melted before adding to the mixture, in the present invention, the gum base is not melted prior to adding it to the mixer.

The entire mixing procedure typically takes from five to fifteen minutes, longer mixing times may sometimes be required. Those skilled in the art will recognize that many variations of the above described procedure may be followed. Again, one specifically contemplated embodiment is the use of an extruding mixer for continuous processing. In such a process, ingredients are added continuously at various points along the length of the extruder while homogeneously mixed gum continuously issues from the discharge end of the extruder. U.S. Pat. No. 6,017,565, herein incorporated by reference, discloses a continuous manufacture process which automatically and continuously feeds ingredients into an apparatus, mixes, and discharges the desired end product. The end product is automatically dusted, rolled scored and wrapped. U.S. Pat. No. 5,543,160 discloses a manufacturing process using high efficiency continuous mixing which does not require separate manufacture of gum base.

After mixing, the chewing gum is formed into a final product shape using well known techniques which may employ extrusion, rolling, sheeting, scoring or forming. The final product shape may be stick, tabs, chunks, pellets, balls or any other desired shape.

Pellet and ball forms, among others, are typically pan coated. Conventional panning procedures generally coat with sucrose, but recent advances in panning have allowed the use of other carbohydrate materials to be used in the place of sucrose. Some of these components include, but are not limited to, erythritol, sorbitol, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Erythritol also acts as a panning modifier with other panning materials to improve product quality. Anti-tack agents may also be added as panning modifiers, which allow the use of a variety of carbohydrates and sugar alcohols to be used in the development of new panned or coated gum products. Flavors may also be added with the erythritol sweetener to yield unique product characteristics.

If the chewing gum composition is in a pellet form, the initial coating syrup should have higher binder levels, e.g. gum Arabic or gum tallah, in the pre-coat, because conventional pre-coat does not stick to the pellet as it would on a conventional chewing gum composition. The increase of a binder allows for the appropriate adherence of the pre-coat. The present invention may be coated in amount ranging from about 30% to about 38%. Preferably, the coating is present at about 32% to about 36%.

The following tables show examples of formulas as possible embodiments of the present invention. The formulas are presented by way of example and not by limitation. Ingredients are expressed in percentages by weight of the formulation. The following gum base formulas were prepared.

TABLE 1

Gum Base Formulations

|  | Example 1 Prior Art | Example 2 Inventive |
|---|---|---|
| Terpene Resin | 25.25 | 28.93 |
| PVAc (12–15K MW) | 27.50 | 33.85 |
| Hydrogenated Veg. Oil | 15.54 | 16.25 |
| Mono/di glycerides | 4.78 | 5.54 |
| High MW PIB | — | 8.15 |
| PIB (~75K MW) | 1.86 | — |
| Butyl Rubber | 9.97 | 2.04 |
| Amorphous Silica (~2.5% water by weight) | — | 4.65 |
| BHA | 0.07 | 0.05 |
| Calcium Carbonate | 11.31 | 0.54 |
| Lecithin | 3.72 | — |
| Total | 100.00 | 100.00 |

The following are additional possible formulations of the inventive chewing gum base and are presented by way of example and not limitation.

TABLE 2

Gum Base Formulations

|  | Ex. 3 Inventive | Ex. 4 Inventive | Ex. 5 Inventive | Ex. 6 Inventive | Ex. 7 Inventive | Ex. 8 Inventive | Ex. 9 Inventive |
|---|---|---|---|---|---|---|---|
| Terpene Resin | 21.00 | 25.00 | 33.00 | 15.00 | 0.00 | 18.00 | 27.00 |
| Low MW PVAc | 31.50 | 28.00 | 16.00 | 40.00 | 31.00 | 25.00 | 35.00 |
| Oil | 14.50 | 12.00 | 18.00 | 12.00 | 19.00 | 9.00 | 2.00 |
| Microcrystalline Wax | 5.00 | 0.00 | 2.00 | 0.00 | 3.00 | 0.00 | 0.00 |
| High MW PIB | 5.00 | 7.00 | 12.00 | 9.00 | 7.00 | 15.00 | 14.00 |

TABLE 2-continued

Gum Base Formulations

|  | Ex. 3 Inventive | Ex. 4 Inventive | Ex. 5 Inventive | Ex. 6 Inventive | Ex. 7 Inventive | Ex. 8 Inventive | Ex. 9 Inventive |
|---|---|---|---|---|---|---|---|
| Med. MW PIB | 0.00 | 0.00 | 5.00 | 0.00 | 6.00 | 2.00 | 0.00 |
| Butyl Rubber | 15.00 | 8.00 | 7.00 | 10.00 | 15.50 | 16.00 | 4.00 |
| SBR | 4.00 | 0.00 | 1.00 | 0.00 | 3.00 | 0.00 | 0.00 |
| Amorphous Silica | 0.00 | 17.00 | 2.00 | 12.00 | 9.00 | 14.50 | 18.00 |
| Calcium Carbonate | 4.00 | 2.00 | 4.00 | 1.00 | 5.00 | 0.00 | 0.00 |
| Lecithin | 0.00 | 1.00 | 0.00 | 1.00 | 1.50 | 0.50 | 0.00 |
| Total | 100.00 | 100.00 | 100.00 | 100.00 | 100.00 | 100.00 | 100.00 |

Chewing Gum Formulations, described herein, were used to generate experimental data described in Table 6.

TABLE 3

Chewing Gum Formulations

|  | Ex. 10 Prior Art | Ex. 11 Inven-tive | Ex. 12 Inven-tive | Ex. 13 Inven-tive | Ex. 14 Inven-tive | Ex. 15 Inven-tive |
|---|---|---|---|---|---|---|
| Base of Ex. 1 | 33.00 | — | — | — | — | — |
| Base of Ex. 2 | — | 25.30 | 27.30 | 25.30 | 26.30 | 25.30 |
| Sorbitol | 46.43 | 61.48 | 59.48 | 61.48 | 60.48 | 61.80 |
| Calcium Carbonate | 13.00 | — | — | — | — | — |
| Glycerin | 4.00 | 2.40 | 2.40 | 2.40 | 2.40 | 2.40 |
| Peppermint flavor | 1.95 | 1.50 | 1.65 | 1.65 | 1.65 | 1.80 |
| Menthol | 0.35 | 0.50 | 0.35 | 0.35 | 0.35 | 0.50 |
| Spray dried Peppermint | — | 1.00 | 1.00 | 1.00 | 1.00 | 0.38 |
| Liquid Lecithin | 0.45 | — | — | — | — | — |
| Deoiled Powdered Lecithin | — | 7.00 | 7.00 | 7.00 | 7.00 | 7.00 |
| Encapsulated APM | 0.68 | 0.68 | 0.68 | 0.68 | 0.68 | 0.68 |
| APM | 0.14 | 0.14 | 0.14 | 0.14 | 0.14 | 0.14 |
| Total | 100.00 | 100.00 | 100.0 | 100.00 | 100.00 | 100.00 |

TABLE 4

Chewing Gum Formulations

|  | Ex. 16 Inven-tive | Ex. 17 Inven-tive | Ex. 18 Inven-tive | Ex. 19 Inven-tive | Ex. 20 Inven-tive | Ex. 21 Inven-tive |
|---|---|---|---|---|---|---|
| Base of Ex. 2 | 25.30 | 25.30 | 25.30 | 25.30 | 25.29 | 25.30 |
| Sorbitol | 61.65 | 61.25 | 61.65 | 62.25 | 62.30 | 61.87 |
| Glycerin | 2.40 | 2.40 | 2.40 | 2.40 | 2.40 | 2.40 |
| Peppermint flavor | 1.80 | 1.80 | 1.65 | 1.50 | 1.65 | 1.50 |
| Menthol | 0.35 | 0.43 | 0.50 | 0.35 | 0.43 | 0.43 |
| Spray dried Peppermint | 0.68 | 1.00 | 0.68 | 0.38 | 0.38 | 0.68 |
| Deoiled Powdered Lecithin | 7.00 | 7.00 | 7.00 | 7.00 | 7.00 | 7.00 |

TABLE 4-continued

Chewing Gum Formulations

| | Ex. 16 Inven-tive | Ex. 17 Inven-tive | Ex. 18 Inven-tive | Ex. 19 Inven-tive | Ex. 20 Inven-tive | Ex. 21 Inven-tive |
|---|---|---|---|---|---|---|
| Encapsulated APM | 0.68 | 0.68 | 0.68 | 0.68 | 0.68 | 0.68 |
| APM | 0.14 | 0.14 | 0.14 | 0.14 | 0.14 | 0.14 |
| Total | 100.00 | 100.00 | 100.00 | 100.00 | 100.00 | 100.00 |

The chewing gums of Examples 10–13 were formed into pellets and pan coated to a level of 67.5% center, 32.5% coating using a coating with the approximate composition:

TABLE 5

Approximate Coating Formulation (Dry Basis)

| | Percent by weight |
|---|---|
| Maltitol | 88.64 |
| Gum Acacia | 8.79 |
| Menthol | 0.74 |
| Peppermint flavor | 0.59 |
| Physiological Cooling Agents | 0.25 |
| APM | 0.27 |

TABLE 5-continued

Approximate Coating Formulation (Dry Basis)

| | Percent by weight |
|---|---|
| Titanium White (Color) | 0.13 |
| Carnauba Wax (Polishing Agent) | 0.59 |
| Total | 100.00 |

The coated pellets (referred to by the example numbers in Table 3 and 4) were tested by adhering the chewed cuds to concrete paving stones placed in an exposed outdoor location. A weight was placed on top of the gum cud for 24 hours to ensure seepage into the outdoor surface. Three to five cuds of each example were tested in each trial. After five days, a first pass with a dry sweeper (Tennant 5700XP) was performed and the percentage of removed chewing gum cud was visually estimated. Thirty minutes after the first pass with the dry sweeper, a first wet pass was performed. A wet pass is the same sweeper as used in the dry pass with the addition of water. Second, third and fourth wet passes were performed at four minute intervals. The percentage of chewing gum cud removed was estimated after each pass. By chance, during one of the trials in the experimentation, the chewing gum cuds were stuck to the outdoor surface for a few days and were exposed to a heavy rainfall. To the surprise of the scientists performing the experiment, it was observed that the experimental chewing gum cuds had been washed away with the rainfall. The average results of all trials are reported in Table 6.

TABLE 6

Removal Test Results (Percent Removed)

| Chewing gum of Example | No. of trials | Be-fore Test | 1st PassDry | 2nd PassWet | 3rd PassWet | 4th PassWet | 5th PassWet |
|---|---|---|---|---|---|---|---|
| 10 - Prior Art | 5 | 0 | 0 | 0 | 0 | 2 | 3 |
| 11 - Inventive | 6 | 0 | 15 | 30 | 58 | 74 | 91 |
| 12 - Inventive | 3 | 0 | 14 | 24 | 53 | 77 | 90 |
| 13 - Inventive | 5 | 0 | 4 | 10 | 36 | 58 | 75 |
| 14 - Inventive | 1 | 0 | 2 | 3 | 8 | 40 | 69 |
| 15 - Inventive | 1 | 0 | 2 | 22 | 72 | 95 | 98 |
| 16 - Inventive | 1 | 0 | 3 | 22 | 68 | 96 | 99 |
| 17 - Inventive | 1 | 0 | 3 | 27 | 68 | 96 | 99 |
| 18 - Inventive | 1 | 0 | 0 | 12 | 92 | 98 | 99 |
| 19 - Inventive | 1 | 0 | 0 | 7 | 73 | 93 | 97 |
| 20 - Inventive | 1 | 0 | 12 | 38 | 83 | 98 | 99 |
| 21 - Inventive | 1 | 0 | 19 | 72 | 96 | 98 | 99 | it should be understood that various changes and modifications to the presently preferred embodiments described herein will be apparent to those skilled in the art. Such changes and modifications can be made without departing from the spirit and scope of the present invention and without diminishing the intended advantages. It is therefore intended that such changes and modifications be covered by the appended claims.

What is claimed is:

1. A chewing gum base comprising high molecular weight polyisobutylene, wherein said chewing gum base is essentially free of non-silica filler.

2. The chewing gum base of claim 1, further comprising amorphous silica.

3. The chewing gum base of claim 1, further comprising low molecular weight polyvinylacetate.

4. The chewing gum base of claim 2, further comprising low molecular weight polyvinylacetate.

5. The chewing gum base of claim 1, wherein said high molecular weight polyisobutylene has an average molecular weight from about 200,000 daltons to about 600,000 daltons.

6. The chewing gum base of claim 1, wherein said high molecular weight polyisobutylene has an average molecular weight of about 400,000 daltons.

7. The chewing gum base of claim 1, wherein said high molecular weight polyisobutylene is present in an amount ranging from about 5% to about 15% by weight of the chewing gum base.

8. The chewing gum base of claim 1, wherein said high molecular weight polyisobutylene is present in an amount of about 8% by weight of the chewing gum base.

9. The chewing gum base of claim 1, further comprising a non-silica filler up to about 3% by weight of the chewing gum base.

10. The chewing gum base of claim 2, wherein said amorphous silica is present in amounts ranging from about 2% to about 15%.

11. The chewing gum base of claim 2, wherein said amorphous silica is present at a level of about 5%.

12. The chewing gum base of claim 3, wherein said low molecular weight polyvinylacetate has an average molecular weight of about 6,000 daltons to about 40,000 daltons.

13. The chewing gum base of claim 3, wherein said low molecular weight polyvinylacetate has an average molecular weight of about 12,000 daltons to about 15,000 daltons.

14. The chewing gum base of claim 3, wherein said low molecular weight polyvinylacetate is present in an amount up to about 45% by weight of said chewing gum base.

15. The chewing gum base of claim 3, wherein said low molecular weight polyvinylacetate is present in an amount ranging from about 25% to about 40% by weight of the chewing gum base.

16. The chewing gum base of claim 4, wherein said low molecular weight polyvinylacetate has an average molecular weight of about 6,000 daltons to about 40,000 daltons.

17. The chewing gum base of claim 4, wherein said low molecular weight polyvinylacetate has an average molecular weight of about 12,000 daltons to about 15,000 daltons.

18. The chewing gum base of claim 4, wherein said low molecular weight polyvinylacetate is present in an amount up to about 45% by weight of said chewing gum base.

19. The chewing gum base of claim 4, wherein said low molecular weight polyvinylacetate is present in an amount ranging from about 25% to about 40% by weight of the chewing gum base.

20. The chewing gum base of claim 3, further comprising a terpene resin.

21. The chewing gum base of claim 3, wherein said gum base is free of ester gums.

22. The chewing gum base of claim 4, further comprising a terpene resin.

23. The chewing gum base of claim 4, wherein said gum base is free of ester gums.

24. A chewing gum composition comprising:
a.) a flavor,
b.) a sweetener, and
c.) a gum base comprising high molecular weight polyisobutylene, amorphous silica, and low molecular weight polyvinylacetate, wherein said gum base is essentially free of non-silica filler.

25. The chewing gum composition of claim 24, further comprising powdered lecithin.

26. The chewing gum composition of claim 25, wherein said powdered lecithin is present in an amount ranging from about 3% to about 9% by weight of the chewing gum composition.

27. The chewing gum composition of claim 25, wherein said powdered lecithin is present in an amount ranging from about 4% to about 7% by weight of the chewing gum composition.

28. The chewing gum composition of claim 24, further comprising spray dried flavor.

29. The chewing gum composition of claim 28, wherein said spray dried flavor is present in an amount up to 2% by weight of the chewing gum composition.

30. The chewing gum composition of claim 28, wherein said spray dried flavor is present in an amount ranging from about 0.2% to about 2% by weight of the chewing gum composition.

31. The chewing gum composition of claim 25, further comprising spray dried flavor.

32. The chewing gum composition of claim 31, wherein said spray dried flavor is present in an amount ranging from about 0.2% to about 2% by weight of the chewing gum composition.

33. A chewing gum comprising
a.) a flavor,
b.) a sweetener, and
c.) a gum base comprising high molecular weight polyisobutylene, wherein said gum base is essentially free of non-silica filler.

34. The chewing gum composition of claim 33, wherein said chewing gum base further comprises amorphous silica.

35. The chewing gum composition of claim 33, wherein said chewing gum base further comprises low molecular weight polyvinylacetate.

36. The chewing gum composition of claim 34, wherein said chewing gum base further comprises low molecular weight polyvinylacetate.

37. The chewing gum composition of claim 33, wherein said high molecular weight polyisobutylene has an average molecular weight from about 200,000 daltons to about 600,000 daltons.

38. The chewing gum composition of claim 33, wherein said high molecular weight polyisobutylene has an average molecular weight of about 400,000 daltons.

39. The chewing gum composition of claim 33, wherein said high molecular weight polyisobutylene is present in an amount ranging from about 5% to about 15% by weight of the chewing gum base.

40. The chewing gum composition of claim 33, wherein said high molecular weight polyisobutylene is present in an amount of about 8% by weight of the chewing gum base.

41. The chewing gum composition of claim 34, wherein said amorphous silica is present in amounts ranging from about 2% to about 15% by weight of said chewing gum base.

42. The chewing gum composition of claim 34, wherein said amorphous silica is present at a level of about 5% by weight of said chewing gum base.

43. The chewing gum composition of claim 35, wherein said low molecular weight polyvinylacetate has an average molecular weight of about 6,000 daltons to about 40,000 daltons.

44. The chewing gum composition of claim 35, wherein said low molecular weight polyvinylacetate has an average molecular weight of about 12,000 daltons to about 15,000 daltons.

45. The chewing gum composition of claim 35, wherein said low molecular weight polyvinylacetate is present in an amount up to about 45% by weight of said chewing gum base.

46. The chewing gum composition of claim 35, wherein said low molecular weight polyvinylacetate is present in an amount ranging from about 25% to about 40% by weight of said chewing gum base.

47. The chewing gum composition of claim 36, wherein said low molecular weight polyvinylacetate has an average molecular weight of about 6,000 daltons to about 40,000 daltons.

48. The chewing gum composition of claim 36, wherein said low molecular weight polyvinylacetate has an average molecular weight of about 12,000 daltons to about 15,000 daltons.

49. The chewing gum composition of claim 36, wherein said low molecular weight polyvinylacetate is present in an amount up to about 45% by weight of said chewing gum base.

50. The chewing gum composition of claim 36, wherein said low molecular weight polyvinylacetate is present in an amount ranging from about 25% to about 40% by weight of said chewing gum base.

51. The chewing gum composition of claim 35, wherein said chewing gum base further comprises a terpene resin.

52. The chewing gum composition of claim 36, wherein said chewing gum base further comprises a terpene resin.

53. The chewing gum composition of claim 33, further comprising spray dried flavor.

54. The chewing gum composition of claim 53, wherein said spray dried flavor is present in an amount ranging from about 0.2% to about 2% by weight of the chewing gum composition.

55. The chewing gum composition of claim 34, further comprising spray dried flavor.

56. The chewing gum composition of claim 55, wherein said spray dried flavor is present in an amount ranging from about 0.2% to about 2% by weight of the chewing gum composition.

57. The chewing gum composition of claim 35, further comprising spray dried flavor.

58. The chewing gum composition of claim 57, wherein said spray dried flavor is present in an amount ranging from about 0.2% to about 2% by weight of the chewing gum composition.

59. The chewing gum composition of claim 36, further comprising spray dried flavor.

60. The chewing gum composition of claim 59, wherein said spray dried flavor is present in an amount ranging from about 0.2% to about 2% by weight of the chewing gum composition.

61. The chewing gum composition of claim 33, wherein said chewing gum base is present in an amount ranging from about 15% to about 30% by weight of the chewing gum composition.

62. The chewing gum composition of claim 33, wherein said chewing gum base is present in an amount ranging from about 25% to about 28% by weight of the chewing gum composition.

63. The chewing gum composition of claim 33, further comprising powdered lecithin.

64. The chewing gum composition of claim 63, wherein said powdered lecithin is present in an amount ranging from about 3% to about 9% by weight of the chewing gum composition.

65. The chewing gum composition of claim 63, wherein said powered lecithin is present in an amount ranging from about 4% to about 7% by weight of the chewing gum composition.

66. The chewing gum composition of claim 34, further comprising powdered lecithin.

67. The chewing gum composition of claim 66, wherein said powdered lecithin is present in an amount ranging from about 3% to about 9% by weight of the chewing gum composition.

68. The chewing gum composition of claim 66, wherein said powdered lecithin is present in an amount ranging from about 4% to about 7% by weight of the chewing gum composition.

69. The chewing gum composition of claim 36, further comprising powdered lecithin.

70. The chewing gum composition of claim 69, wherein said powered lecithin is present in an amount ranging from about 3% to about 9% by weight of the chewing gum composition.

71. The chewing gum composition of claim 69, wherein said powdered lecithin is present in an amount ranging from about 4% to about 7% by weight of the chewing gum composition.

72. The chewing gum composition of claim 63, wherein said powdered lecithin is encapsulated.

73. The chewing gum composition of claim 66, wherein said powdered lecithin is encapsulated.

74. The chewing gum composition of claim 69, wherein said powdered lecithin is encapsulated.

75. The chewing gum composition of claim 33, further comprising active agents selected from the group consisting of acidulants, antimicrobials, tooth whitening agents, medicaments, pharmaceutical agents, nutritional supplements, wellness agents, weight loss agents, breath freshening agents and combinations thereof.

76. The chewing gum composition of claim 33, further comprising components selected from the group consisting of bulk sweeteners, coolants, glycerin, colors, high intensity sweeteners, oral sensates, fats, oils, and combinations thereof.

77. The chewing gum composition of claim 36, wherein a chewed cud of said chewing gum composition is capable of being washed away with water if said chewed cud is adhered to:

a.) concrete, b.) a paved surface, or c.) a hard environmental surface.

78. The chewing gum composition of claim 36, wherein said chewing gum composition exhibits reduced adhesion to environmental surfaces, after chewing, compared to conventional chewing gum.

79. The chewing gum composition of claim 36, wherein after having been chewed, the remaining chewing gum cud exhibits reduced adhesion to environmental surfaces compared to conventional chewing gum cuds.

80. The chewing gum composition of claim 36, wherein the shape of said chewing gum is selected from the group consisting of stick, pellet, ball, square, and cube.

81. The chewing gum composition of claim 36, wherein said chewing gum is in the shape of a pellet.

82. The chewing gum product comprising the chewing gum pellet of claim 81, wherein said pellet is coated with a coating from about 31% to about 36% by weight of the product.

83. A chewing gum composition comprising:

a.) a flavor, b.) a sweetener, and c.) a gum base comprising high molecular weight polyisobutylene, amorphous silica, and low molecular weight polyvinylacetate, wherein said gum base is free of non-silica filler.

* * * * *